J. DEMOVITSCH.
DOUGH CUTTING MACHINE.
APPLICATION FILED SEPT. 20, 1916.

1,226,642.

Patented May 22, 1917.
2 SHEETS—SHEET 1.

WITNESSES

INVENTOR

J. DEMOVITSCH.
DOUGH CUTTING MACHINE.
APPLICATION FILED SEPT. 20, 1916.

1,226,642.

Patented May 22, 1917.
2 SHEETS—SHEET 2.

WITNESSES
R. F. Dilworth
B. E. Jenkins

INVENTOR
John Demovitsch
By Max H. Srolong
his Atty.

UNITED STATES PATENT OFFICE.

JOHN DEMOVITSCH, OF PITTSBURGH, PENNSYLVANIA.

DOUGH-CUTTING MACHINE.

1,226,642.  Specification of Letters Patent.  Patented May 22, 1917.

Application filed September 20, 1916. Serial No. 121,114.

*To all whom it may concern:*

Be it known that I, JOHN DEMOVITSCH, a subject of the Emperor of Austria-Hungary, residing at Pittsburgh, county of Allegheny, and State of Pennsylvania, have invented certain new and useful Improvements in Dough-Cutting Machines, of which the following is a specification.

This invention relates to dough cutting machines and has for its object to provide a machine of such class, in a manner as hereinafter set forth, with means whereby the machine can be adjusted to provide for the cutting of loaves of different sizes.

Further objects of the invention are to provide a dough cutting machine which is simple in its construction and arrangement, strong, durable, efficient and convenient in its use, readily set up, and comparatively inexpensive to manufacture.

With the foregoing and other objects in view the invention consists of the novel construction, combination and arrangement of parts as hereinafter more specifically described and illustrated in the accompanying drawing, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1:
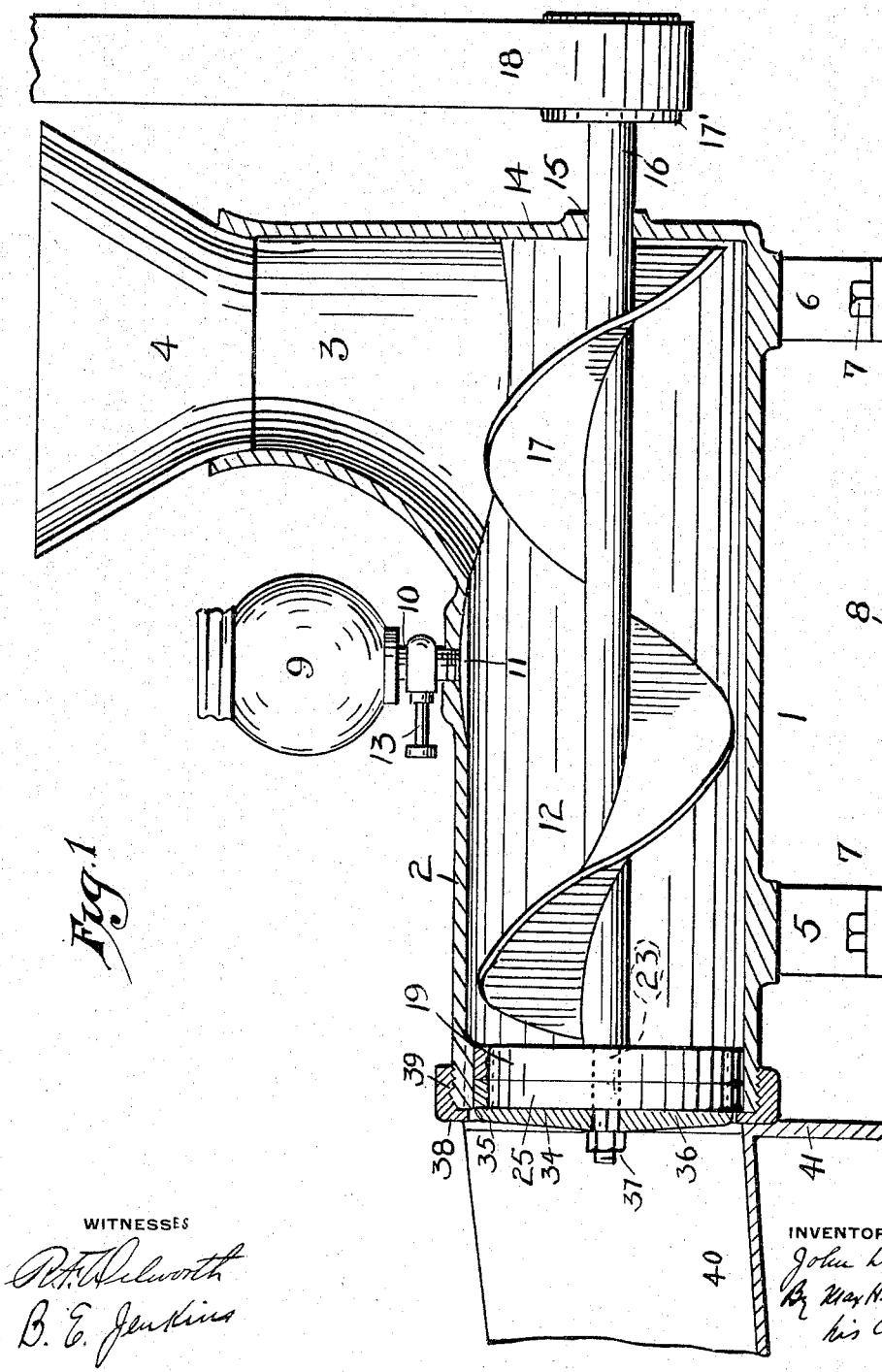
Figure 1 is a longitudinal sectional view of a dough cutting machine in accordance with this invention.
Figure 2:
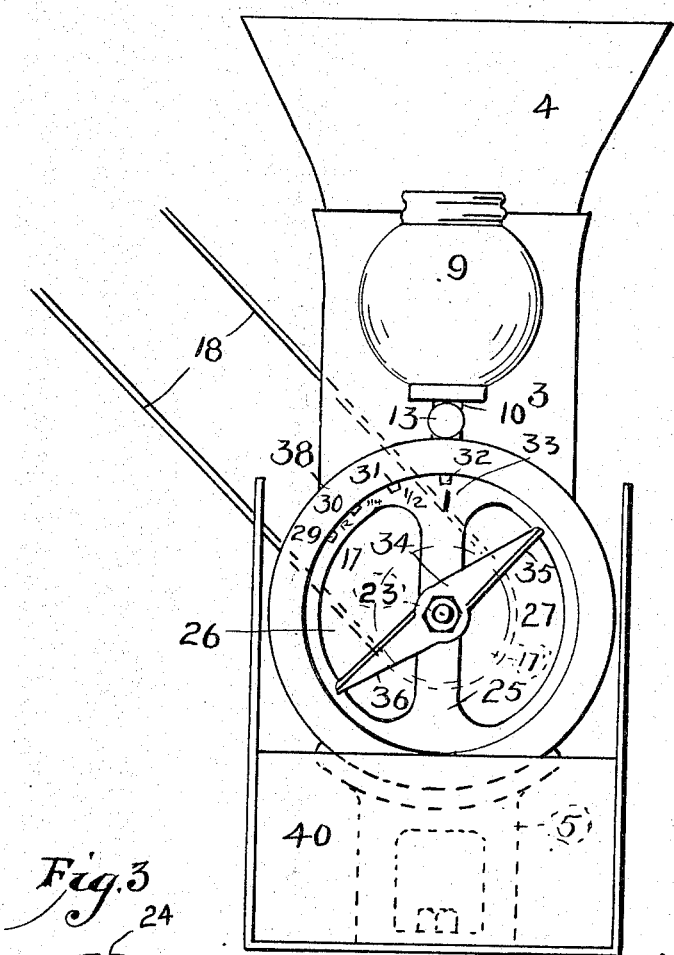
Fig. 2 is a front elevation thereof.
Figure 3:
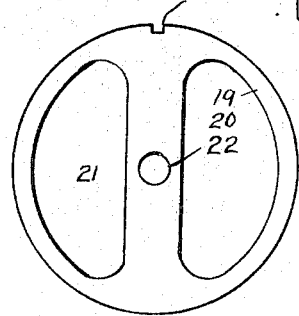
Fig. 3 is an elevation of the stationary plate of the device for regulating the size of the loaf.
Figure 5:
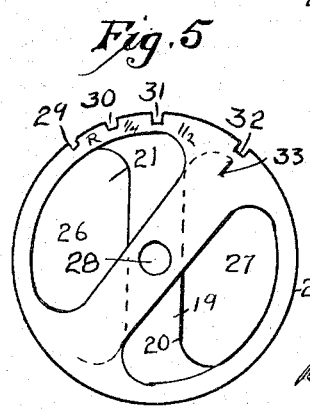
Fig. 5 is an elevation of the stationary and adjustable indicator plates, connected together, of a means for regulating the size of the loaf.
Figure 4:
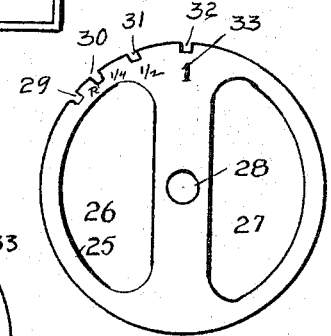
Fig. 4 is a like view of the adjustable indicator plate for regulating the size of the loaf.

Referring to the drawings in detail 1 denotes the body of the machine which consists of a longitudinally extending cylindrical portion 2 and a vertically disposed cylindrical portion 3 which projects from one end of the portion 2, as well as connected therewith, and which further decreases in size upwardly. The upper end of the portion 3 is open and secured therein is a tapering receptacle 4 for conducting the batch of dough into the portion 3 of the body 1 of the machine.

The body 1 of the machine may be clamped in any suitable manner to a support, but as shown is provided with uprights or legs 5, 6, which are fixedly connected, by securing devices 7, to a support 8. The portion 2 of the body 1 of the machine has arranged over the top thereof a receptacle 9, which provides an oil reservoir, containing such as lard oil, and which has leading therefrom a discharge pipe 10, opening at 11, into the chamber 12 formed by the body 1. The pipe 10 is provided with a cut-off 13 for regulating or shutting off, the supply of lard oil to the chamber 12.

One end of the portion 2, of the body 1, of the machine, is closed as at 14, and said closed end has an opening 15, for the passage of a longitudinally extending conveyer shaft 16, which carries a spiral conveyer 17, the latter of a length as to extend from the end 14 of the chamber 12 to near the forward end thereof. The shaft 16 carries a pulley 17', exteriorly of the machine body 1, and said pulley is connected by transmission belt 18 to any suitable means for revolving the shaft 16.

That end of the portion 2 of the machine body 1, which is opposite the end 14, has fixedly secured therein a circular plate or disk 19, formed with a pair of vertically disposed openings 20, 21, which are substantially oval-shaped and said plate 19, centrally thereof, has an opening 22 through which extends the reduced end 23 of the shaft 16. The plate 19 at its top, has the edge thereof formed with a notch 24 which receives a lug 24ᵃ on the inner face of the portion 2 of the machine body 1. The plate 19 is arranged within the portion 2 of the machine body 1.

Arranged within the portion 2 of the body 1 of the machine and positioned against the plate 19, is an adjustable plate or disk 25, having a pair of vertically disposed openings 26, 27, substantially oval-shaped in contour, and the said plate 25 is furthermore provided centrally thereof with an opening 28 for the passage of the reduced end 23 of the shaft 16. The edge of the plate 25 is formed with a series of spaced notches 29, 30, 31 and 32, each having an indication as at 33, associating therewith, to indicate the size of the loaf and each of the notches 29, to 32 is adapted to register with the notch 24 when the plate 25 is adjusted to regulate the size of the loaf desired. The lug 24ª is adapted to seat in one of the notches of the plate 25 when the latter is adjusted to maintain it in an adjusted position.

The walls of the openings 22 and 28 provide bearings for the reduced end 23 of the shaft 16 and the said reduced end 23 projects outwardly from the plate 25 and has fixedly mounted thereon a knife or cutter 34, having a pair of blades 35, 36, and which are utilized for cutting the dough as it is forced through the regulating means for the size of the loaf, and said regulating means consists of the stationary plate 19 and the adjustable plate 25. The dough is forced by the conveyer through the openings 20, 21 of the plate 19 and 26 and 27 of the plate 25. The opening 20 of the plate 19 registers with the opening 27 of the plate 25 and the opening 21 of the plate 19 registers with the opening 26 of the plate 25. The cutter 34 is maintained upon the reduced end 23 of the shaft 16 by a nut 37.

The plate 25 is maintained in position within the portion 2 of the body 1 of the machine against the plate 19 by a flanged clamping band 38 which has threaded engagement, as at 39, with the periphery of the portion 2 of the machine 1.

Arranged in advance of the cutter 34 is a chute 40 for conducting off the loaves which are cut from the batch of dough as the latter is forced through the openings 20, 21, 26 and 27. The reference character 41 denotes a support for the chute 40.

The apertured plates 19 and 25 provide two pair of duplex discharge openings for the dough and the duplex discharge openings, owing to the adjustability of the plate 25, can be so regulated to increase or decrease the size thereof to provide for different sizes of loaves as hereinafter stated.

When adjusting the plate 25, the cutter 34 and flanged clamping band 38 are removed, the plate 25 is then adjusted, and the bands 38 and cutter 34 replaced.

The lard oil is supplied to the chamber 12 to prevent any possibility of the batch of dough sticking to the wall or conveyer 17 when the batch is forced by the conveyer to the duplex outlet openings to be cut into loaves.

What I claim is:—

1. A dough cutting machine comprising a conveyer chamber, a conveyer in said chamber, a stationary and an adjustable plate opposing each other and mounted in one end of said chamber, each of said plates provided with a pair of oppositely disposed vertically extending large semi-circular openings spaced from each other, the openings in one plate opposing the openings in the other plate and associating to provide a pair of outlets for said chamber and through which batches of dough are forced by the conveyer, means carried by the wall of the chamber and engaging in the edge of the stationary plate to prevent the shifting thereof during the operation of the machine, said adjustable plate having its edge provided with a plurality of notches, one of said notches, when said plate is adjusted, receiving said means to prevent shifting of the plate, the adjusting of said adjustable plate regulating the size of said outlets, a pair of cutters arranged forwardly of said adjustable plate, and a common means for operating the conveyer and cutters.

2. A dough cutting machine comprising a conveyer chamber, a pair of opposed plates mounted at one end of said chamber and one having its edge provided with a notch and the other having its edge provided with a plurality of notches, means carried by the wall of the chamber and engaging in the notches of each of said plates to prevent the shifting thereof during the operation of the machine, that plate having the plurality of notches being adjustable relative to the other plate, and said means to prevent shifting of the plates engaging in the notch of the adjustable plate to maintain it in position when it has been adjusted, said adjustable plate arranged outwardly with respect to the other plate, means overlapping the adjustable plate to prevent outward movement thereof, a conveyer mounted in said chamber and including a shaft extending through and rotatable in said plates, each of said plates provided with a pair of oppositely disposed enlarged semi-circular openings, the openings of said plates associating to provide a pair of outlets for said chamber through which the batches of dough are forced by the conveyer, the adjusting of said adjustable plate regulating the size of said outlets, and a pair of cutters mounted on the conveyer shaft outwardly with respect to said adjustable plate for cutting the batches of dough into loaves as the batches pass through said outlets.

In testimony whereof I affix my signature in the presence of two witnesses.

JOHN DEMOVITSCH.

Witnesses:
JULIE DEMOVITSCH,
LUELLA H. SIMON.